(12) United States Patent
Kim

(10) Patent No.: US 6,433,811 B1
(45) Date of Patent: Aug. 13, 2002

(54) METHOD FOR ADJUSTING PRINT DENSITY IN A PRINTER

(75) Inventor: Kwang-Seuk Kim, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/594,158

(22) Filed: Jun. 15, 2000

(30) Foreign Application Priority Data

Jun. 30, 1999 (KR) ............................................ 99-25720

(51) Int. Cl.[7] ............................... B41J 2/47; H04N 1/23
(52) U.S. Cl. ......................... 347/251; 347/240; 358/298
(58) Field of Search .................................. 347/237, 240, 347/132, 251, 14, 19; 358/300, 298, 456; 399/42; 395/104; 382/164; 271/110

(56) References Cited

U.S. PATENT DOCUMENTS

| | | | | |
|---|---|---|---|---|
| 5,444,551 A | * | 8/1995 | Miller et al. ................. | 358/456 |
| 5,652,660 A | * | 7/1997 | Seto et al. .................... | 358/300 |
| 5,812,903 A | * | 9/1998 | Yamada et al. ................ | 399/42 |
| 5,892,890 A | * | 4/1999 | Clouthier et al. ........... | 395/104 |
| 5,959,650 A | * | 9/1999 | Fukui et al. ................. | 347/132 |
| 5,999,645 A | * | 12/1999 | Ito ............................. | 382/164 |
| 6,032,944 A | * | 3/2000 | Lee ............................ | 271/110 |
| 6,213,579 B1 | * | 4/2001 | Cornell et al. ................ | 347/14 |

* cited by examiner

*Primary Examiner*—Hai Pham
(74) *Attorney, Agent, or Firm*—Robert E. Bushnell, Esq.

(57) ABSTRACT

Disclosed is a method for enhancing print quality by adjusting a print density of a printer according to changes in the environment. Threshold tables having different threshold values corresponding to different environments of a printer engine are stored in the printer and the printer itself can perform a halftone process. According to the method, print data to be printed are first received and stored when a print operation command is received. Then, present environmental state information is received from the printer engine. Corresponding to the present environmental state information, a threshold table is selected among the threshold tables. Thereafter, the lightness of the print data is determined through the selected threshold table and the halftone process is performed. Then, the print data that is image-processed through the halftone process is transmitted to the printer engine to be printed.

21 Claims, 4 Drawing Sheets

| | |
|---|---|
| 138, 158, 203, 183, 143,<br>178, 238, 243, 208, 163,<br>198, 233, 248, 213, 188,<br>153, 228, 223, 218, 168,<br>133, 173, 193, 148, 128, | 113, 93, 48, 68, 108,<br>73, 13, 8, 43, 88,<br>53, 18, 3, 38, 63,<br>98, 23, 28, 33, 83,<br>118, 78, 58, 103, 123, |
| 113, 93, 48, 68, 108,<br>73, 13, 8, 43, 88,<br>53, 18, 3, 38, 63,<br>98, 23, 28, 33, 83,<br>118, 78, 58, 103, 123, | 138, 158, 203, 183, 143,<br>178, 238, 243, 208, 163,<br>198, 233, 248, 213, 188,<br>153, 228, 223, 218, 168,<br>133, 173, 193, 148, 128, |

Fig. 4

METHOD FOR ADJUSTING PRINT DENSITY IN A PRINTER

CLAIM OF PRIORITY

This application makes reference to, incorporates the same herein, and claims all benefits accruing under 35 U.S.C. §119 from my application METHOD FOR ADJUSTING PRINTING DENSITY IN PRINTER filed with the Korean Industrial Property Office on Jun. 30, 1999 and there duly assigned Ser. No. 25720/1999.

BACKGROUND OF THE INVENTION

1. Field of the Invention

This invention relates to a method for adjusting print density in a printer. More specifically, the present invention is capable of enhancing print quality of a print control language 6 (PCL6) printer or a PostScript mode printer which can perform halftone process therein by applying different threshold tables to a halftone process according to changes in peripheral environment (e.g., temperature and humidity) of an engine of the printer.

2. Description of the Related Art

Generally, as one of the image forming devices using the electrophotographic developing method, a printer includes a pickup roller, a charging roller, an organic photoconductive (OPC) drum, a transferring roller, a developing roller, a supplying roller, a fixing unit and an exposing device in order to print a predetermined image data on a paper.

The charging roller, which is charged with a high voltage, is rotated and evenly charges a photosensitive body on the outer periphery of the OPC drum. At this time, light emitted from the exposing device forms an electrostatic latent image on the outer periphery of the charged OPC drum. Then, a potential difference occurs between the supplying roller supplied with a high potential supplying voltage and the developing roller supplied with a lower level voltage than the supplying roller. Accordingly, negative charges move from the supplying roller 106 to the developing roller. In this manner, toner is supplied from the developing roller and coated on the electrostatic latent image formed on the outer periphery of the OPC drum so that the electrostatic latent image is changed into a visible image. The transferring roller at high potential transfers the visible image formed on the OPC drum to a transferred paper. The transferred visible image is fixed on the paper by the heat and pressure of a heating roller and a pressing roller of the fixing unit. This completes this printing process by the printer.

The supplying voltage, the developing voltage, the transferring voltage, and the charging voltage described above are continuously supplied to the supplying roller, the developing roller. the transferring roller and the charging roller, respectively. And the heating roller in the fixing unit is maintained in the turned-on state until the printing process is terminated.

Moreover, a pre-transfer lamp (PTL) is located between the developing roller and the transferring roller. The PTL generates light having a wavelength of 650 nm and applies the light to the OPC drum. Then, the electric potential of the toner coated on the OPC drum is lowered and the bonding force of the toner to the OPC drum is reduced. As a result, transfer efficiency is enhanced.

On the other hand. the method for adjusting the lightness of an image is largely divided into two methods: one is a method for adjusting the lightness of the image in a printer drive program; and the other is a method for directly adjusting the lightness of the image in a printer engine.

In the case that the printer is a type having a translatable language mode below PCL 5 mode, the user can adjust the image density in the printer drive program of the computer. Therefore, the user can adjust print density through an ECONO mode (for economizing on toner), a RET mode and so on in the printer drive program. In the "econo mode", the amount of toner corresponding to each pixel is entirely reduced, thereby saving the toner. In the "ret mode", the toner is not provided in some of pixels making up a spot, thereby saving the toner. Moreover, since the halftone process is performed in the printer drive program of the computer in the case of a printer below the PCL 5 mode, changes in the peripheral environment cannot be actively coped with and all the halftone processes in the printer are performed in the same manner. As a result, the print quality varies with the changes in the peripheral environment.

There is a general analog controlling method through a printer engine part. According to this method, the lightness of the image is adjusted by adjusting a variable resistance value controlled by a knob, which varies the charging voltage, the developing voltage, and the transferring voltage and so on. This method, however, suffers from the inconvenience that the knob attached to the printer needs to be directly adjusted by the user. Furthermore, since the adjustment is made by determination of the user. it is difficult to obtain uniform print quality.

On the other hand, a printer having PCL6 as a translatable language or using a PostScript mode can perform the halftone process therein. Accordingly, the process load of the computer is reduced. At this time, the central processing unit (CPU) of the printer includes a threshold table stored therein. The threshold value in the threshold table and a lightness value of the image information to be presently processed are compared for each pixel. When the lightness value of the image information is larger than the threshold value, the lightness value is assigned as 0 and when the lightness value of the image information is smaller than the threshold value, the lightness value is assigned as 1. Then, the halftone process is performed according to the determined values. Therefore, the lightness of the image is determined according to the respective threshold values of the threshold table.

However, several problems occur in such a conventional halftone process of the printer. The print quality of the printer is very sensitive to changes in the peripheral environment (e.g., temperature and humidity). Particularly, since the resistance between the paper and the transferring roller is increased in a low temperature and low humidity environment, the image is printed more lightly and the image density is lower than when printed in a normal environment.

The resistance between the paper and the transferring roller is correspondingly reduced in a high temperature and high humidity environment. As a result. the image is printed more darkly and the image density is heightened compared to that printed in a normal environment. However, since the threshold value for the halftone processing is fixed in the threshold table, it is impossible to compensate for such changes in the peripheral environment and accordingly the print density (i.e., lightness of the image) varies with the environmental changes. This results in deteriorated print quality.

SUMMARY OF THE INVENTION

It is therefore an object of the present invention to provide an improved halftone printing method.

A further object of the invention is to provide a halftone printing method which compensates for print density changes due to environmental changes.

A yet further object of the invention is to provide a halftone printing method which does not require high memory capacity.

These and other objectives are met in the present invention, which provides a method for adjusting print density and increasing print quality of a printer by fixing a plurality of threshold tables corresponding to the environmental changes, applying a different threshold table according to detected environmental changes such as temperature, humidity and so on, and uniformly maintaining the image density even though the environment changes.

The above and other objects are provided according to the present invention by providing a method for adjusting a print density of a printer which includes at least a threshold table having different threshold values corresponding to environmental states of a printer engine stored therein and is capable of performing a halftone process therein, the method including the steps of. when a print operation command is received, receiving and storing print data to be printed; detecting present environmental state information in the printer engine and receiving the present environmental state information from the printer engine; selecting a threshold table corresponding to the present environmental state information among the threshold tables; determining a lightness of the print data through the selected threshold table and performing the halftone process: and transmitting the print data that is image-processed through the halftone process to the printer engine to be printed.

Preferably, the environmental state includes at least present temperature and present humidity.

Moreover, it is preferable that the environmental state is divided into three states of a high temperature and high humidity state, a low temperature and low humidity state and a normal state.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein:

FIG. 4 is an embodiment of a threshold table having a 10×10 array of pixels, for a halftone process.

DETAILED DESCRIPTION OF THE DRAWINGS

Figure 1:
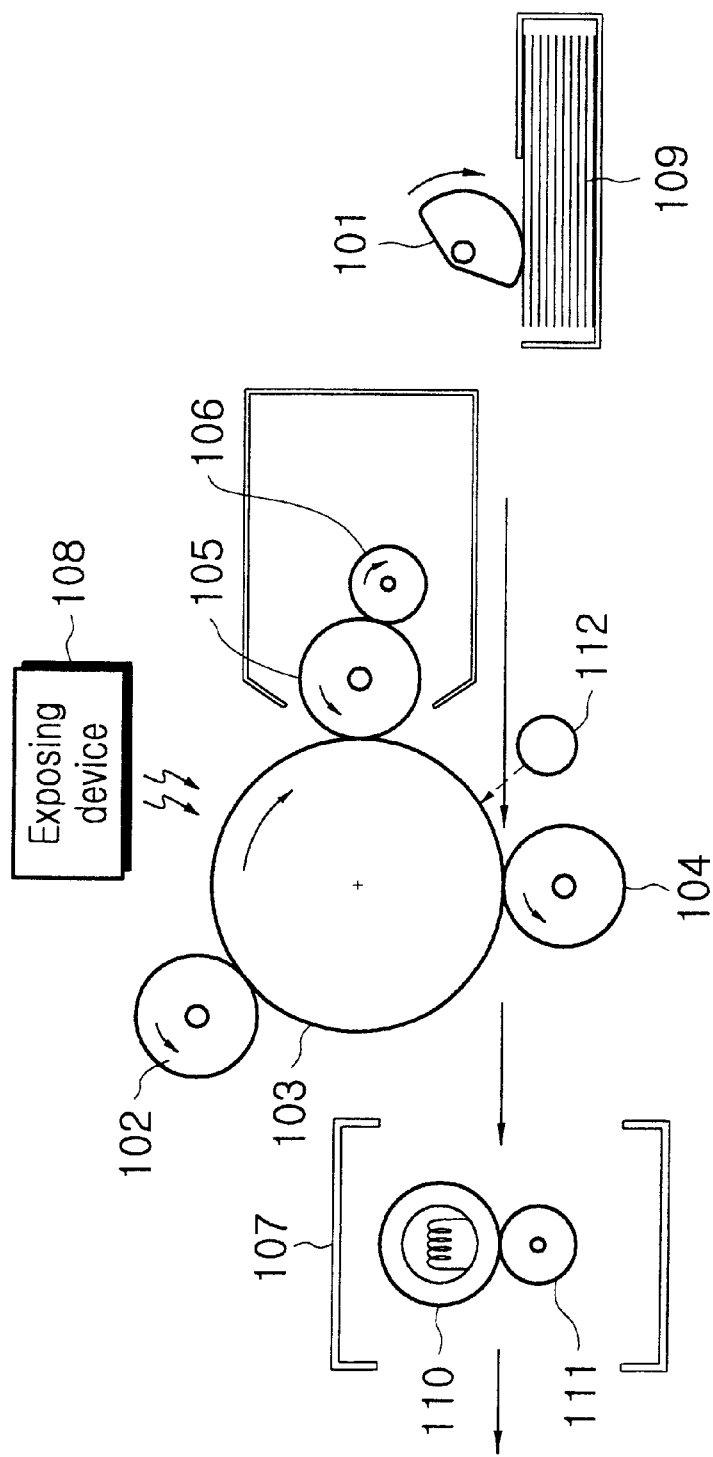
FIG. 1 is a schematic diagram of a printer using a conventional electrophotographic developing method.

Turning now to the drawings, the exemplary printer described above includes, as shown in FIG. 1, a pickup roller 101, a charging roller 102, an organic photoconductive (OPC) drum 103, a transferring roller 104, a developing roller 105, a supplying roller 106, a fixing unit 107 and an exposing device 108 in order to print a predetermined image data on a paper.

The charging roller 102 is rotated by a charging voltage of high potential and evenly charges a photosensitive body on the outer periphery of the OPC drum 103. At this time, light emitted from the exposing device 108 forms an electrostatic latent image on the outer periphery of the charged OPC drum 103. Then, a potential difference occurs between the supplying roller 106 supplied with a high potential supplying voltage and the developing roller 105 supplied with a lower level voltage than the supplying roller 106. Accordingly, negative charges move from the supplying roller 106 to the developing roller 105. In this manner, toner is supplied from the developing roller 105 and coated on the electrostatic latent image formed on the outer periphery of the OPC drum 103 so that the electrostatic latent image is changed into a visible image. The transferring roller 104 at high potential transfers the visible image formed on the OPC drum 103 to a transferred paper 109. The transferred visible image is fixed on the paper 109 by the heat and pressure of a heating roller 110 and a pressing roller 111 of the fixing unit 107. This completes this printing process by the printer.

The supplying voltage, the developing voltage, the transferring voltage, and the charging voltage described above are continuously supplied to the supplying roller 106, the developing roller 105, the transferring roller 104 and the charging roller 102, respectively. And the heating roller 110 in the fixing unit 107 is maintained in the turned-on state until the printing process is terminated.

Moreover, a pre-transfer lamp (PTL) 112 is located between the developing roller 105 and the transferring roller 104. The PTL 112 generates light having a wavelength of 650 nm and applies the light to the OPC drum 103. Then, the electric potential of the toner coated on the OPC drum 103 is lowered and the adherence of the toner to the OPC drum 103 is reduced. As a result, transfer efficiency is enhanced.

The present invention will now be described more fully hereinafter with reference to the accompanying drawings. Like reference symbols in the drawings indicate the same or similar components. Specification of components, such as components of circuits are provided for description purpose. It is therefore apparent to those skilled in this art that the present invention can be embodied without the specified components. The detailed description might be omitted when it is determined that related prior art or the detailed description of the structure may unnecessarily make indistinct the point of the present invention.

Figure 2:
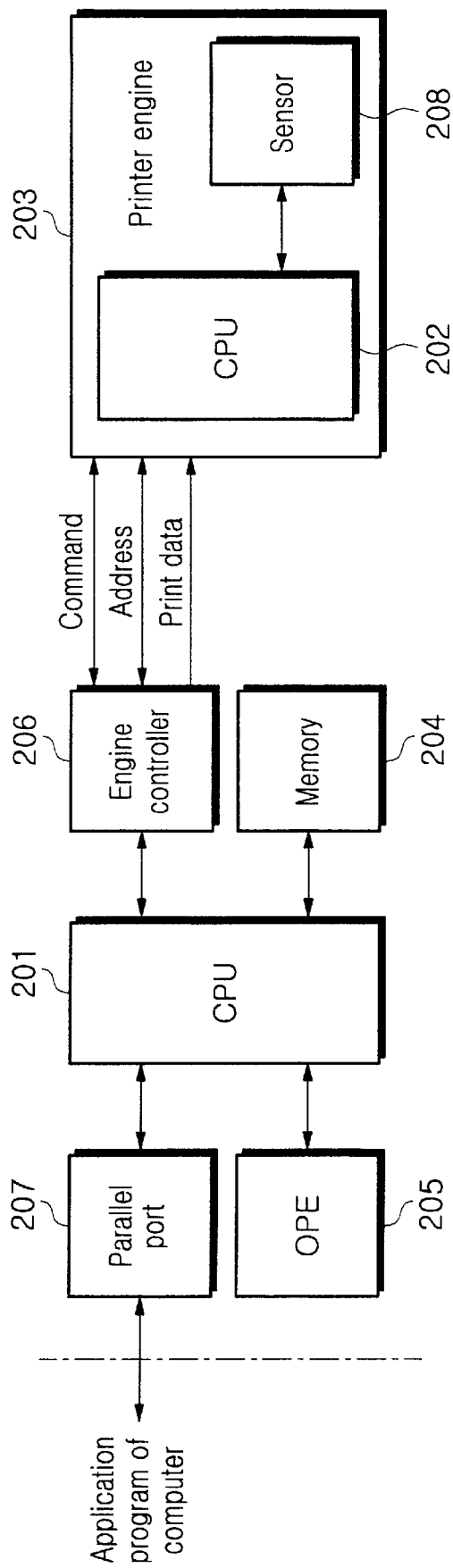
FIG. 2 is a schematic block diagram of a printer applied to the present invention.
Figure 3:
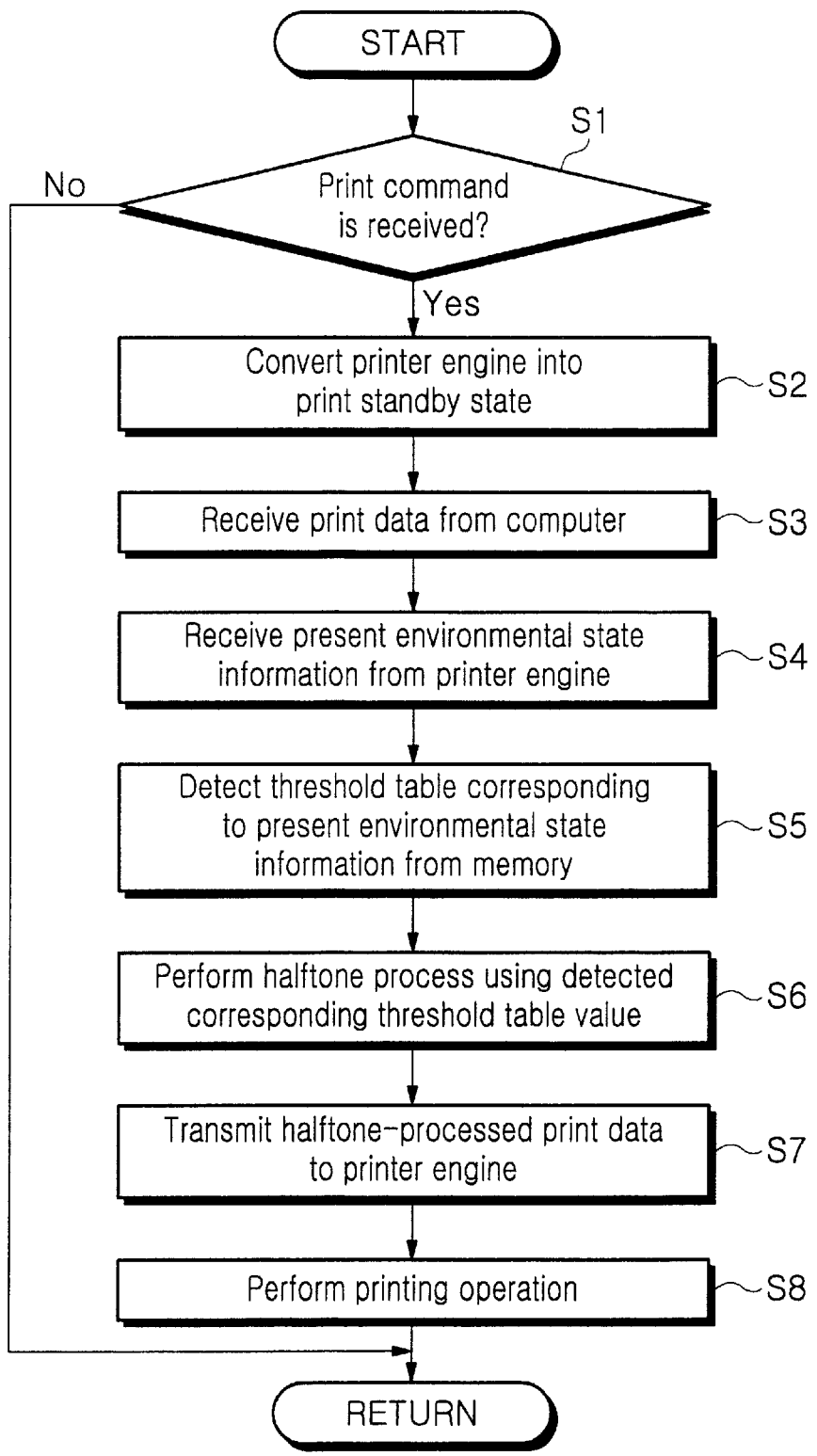
FIG. 3 is a flowchart of a method for adjusting print density of a printer according to the present invention.

FIG. 2 is a schematic block diagram of a printer applied to the present invention, FIG. 3 is a flowchart of a method for adjusting print density of a printer according to the present invention, and FIG. 4 is an embodiment of a threshold table for a halftone process.

Referring to FIG. 2, a central processing unit (CPU) 201 of a printer generally controls all components of the printer. Particularly, the printer CPU 201 communicates with CPU 202 of printer engine 203 through engine controller 206 to receive environmental elements, or parameters, (e.g., temperature, humidity and so on) in the printer engine 203, selects a threshold table corresponding to the received environmental elements, and performs a halftone process of print data to be printed according to the selected threshold table.

In a memory 204, print data transmitted from an application program of a computer is temporarily stored and temporary data generated through an image process (including the halftone process) of the print data is also stored. Furthermore, at least a threshold table respectively corresponding to the environmental elements is stored in the memory 204.

An operational panel (OPE) 205 includes a plurality of function keys by which a user selects functions and a displaying unit for displaying the operational state of the printer.

An engine controller 206 exchanges various commands with the printer engine CPU 202, transmits address information and transmits bit-map data that are image-processed and stored in the memory 204 to the printer engine CPU 202, and controls the entire operational states, operation start time and power supplying state of the printer engine 203.

A parallel port 207 is connected to the computer to interface the computer and the printer. The parallel port 207 receives print data formed in the application program of the computer and temporarily stores the received print data in the memory 204.

On the other hand, the printer engine CPU 202 generally controls driving states in the printer engine 203 as shown in FIG. 1. Particularly, the printer engine CPU 202 exchanges various commands with the engine controller 206, transmits environmental element information detected in a sensor 208 to the engine controller 206, converts temporary data transmitted from the engine controller 206 into bit-map data, and performs the actual printing operation with the bit-map data. The sensor 208 detects environmental elements (e.g., temperature and humidity) in the printer engine 203 and transmits the detected result to the printer engine CPU 202.

Referring to FIGS. 3 and 4, the operation of the present invention structured as described above will now be described. A PCL6 or a PostScript mode printer prints an image such as a photograph after receiving greyscale pixel data from the computer and performing the halftone process therein. At this time, the lightness of the actually printed image is determined by a threshold table used in the halftone process. In other words, when a printing operation command is received from the user (S1), the printer CPU 201 controls the engine controller 206 to convert the state of the printer engine 203 into the print standby state (S2).

Thereafter, the printer CPU 201 receives print data formed in the application program of the computer through the parallel port 207 (S3) and receives present environmental state information from the printer engine 203 (S4). In other words, the printer engine CPU 202 controls the sensor 208 to detect the present environmental state in the printer engine 203 and transmits the detected present environmental state information to the engine controller 206. The engine controller 206 then transmits the present environmental state information transmitted from the printer engine 203 to the printer CPU 201.

The printer CPU 201 compares the present environmental state information detected through the printer engine 203 with parameters for respective threshold tables (as shown in FIG. 4) in the memory 204 and selects a threshold table corresponding to the present environmental state information among the plurality of threshold tables (S5). And, the printer CPU 201 determines the lightness of the image using the selected corresponding threshold table values and performs a halftone process according to the determined result (S6).

Thereafter, the printer CPU 201 transmits the halftone-processed print data to the printer engine 203 (S7), and the printer engine 203 accordingly performs printing operation (S8). In other words, the printer CPU 201 transmits the halftone-processed print data to the engine controller 206 and the engine controller 206 transmits a command to the printer engine CPU 202 to thereby convert the printer engine CPU 202 to a print data receivable mode. Then, the engine controller 206 transmits actual print data to the printer engine CPU 202 and the printer engine CPU 202 prints the transmitted print data.

If, at this time, the environment is under a low temperature and low humidity condition, the resistance between the paper and the transferring roller is increased and accordingly the print data is printed on the paper more lightly than when printed in a normal environment. In this case, the printer CPU 201 selects a threshold table that can make the print density of the print data higher, from the memory 204 according to the present environmental state information and performs the halftone process according to the selected threshold table. And, if the environment is under high temperature and high humidity condition, the resistance between the paper and the transferring roller is reduced and accordingly the print data is printed on the paper more darkly than when printed in a normal environment. In this case, the printer CPU 201 selects a threshold table that can make the print density of the print data lower from the memory 204 according to the present environmental state information and performs the halftone process according to the selected threshold table.

As described above, regardless of changes in the environmental state, an optimum print density can be obtained according to the present invention. This results in enhanced print quality.

In one embodiment, the method for adjusting print density of an image according to the present invention includes three states: a high temperature and high humidity environment, a low temperature and low humidity environment, and a normal environment as the environment state in the printer engine 203. By grouping various possible states in the printer engine 203 into the above three states, capacity required in the memory 204 can be greatly reduced compared with when used more than three states as the environmental states in the printer engine 203.

This invention has been described above with reference to the aforementioned embodiments. It is evident, however. that may alternatives, modifications and variations will be apparent to those having skill in the art in light of the foregoing description. Accordingly, the present invention embraces all such alternatives. modifications and variations as fall within the spirit and scope of the appended claims and their equivalents.

Therefore, the method for adjusting print density of a printer according to the present invention provides an advantage of constantly obtaining optimum print quality regardless of changes in peripheral environment by storing a plurality of threshold tables having different threshold values according to the environmental state such as temperature, humidity and so on, detecting the present environmental state in the printer engine, selecting a threshold table corresponding to the detected present environmental state information among the plurality of threshold tables, determining the lightness of an image to be printed according to the selected threshold table to allow the image to be halftone-processed in the printer.

What is claimed is:

1. A method for adjusting print density in a halftone process of a printer, comprising the steps of:

when a print operation command is received, receiving and storing print data to be printed;

detecting an environmental state in a printer engine by an environmental sensor;

receiving environmental state data-of the environmental state in the printer engine;

comparing the environmental state data with parameters for a plurality of halftone threshold tables having different threshold values corresponding to the environmental state;

selecting a halftone threshold table, from the plurality of halftone threshold tables, corresponding to the environmental state data, whereby a print image density is controlled; and performing the halftone process using the stored print data and the selected halftone threshold table.

2. The method of claim 1, said step of receiving environmental state data further comprising:

transferring the environmental state data from a central processing unit of the printer engine to a main central processing unit of the printer.

3. The method of claim 2, said step of receiving the environmental state data further comprising:

transferring the environmental state data from the central processing unit of the printer engine to an engine controller; and transferring the environmental state data from the engine controller to the main central processing unit of the printer.

4. The method of claim 2, said step of receiving environmental state data further comprising the step of:

transferring the environmental state data from the environmental sensor in the printer engine to the central processing unit of the printer engine.

5. The method of claim 1, said environmental state data comprising temperature data.

6. The method of claim 1, said environmental state data comprising humidity data.

7. The method of claim 1, there being exactly three stored halftone threshold tables.

8. The method of claim 7, the three halftone threshold tables corresponding to the environmental states of:

high humidity and high temperature;

normal humidity and normal temperature; and low temperature and low humidity.

9. The method of claim 8, the threshold table for the high humidity and high temperature environmental state yielding a lower print density than the threshold table for the normal humidity and normal temperature state.

10. The method of claim 8, the threshold table for the low humidity and low temperature environmental state yielding a higher print density than the threshold table for the normal humidity and normal temperature state.

11. The method of claim 1, further comprising the step of:

operating said printer under Print Control Language 6 mode.

12. The method of claim 1, further comprising the step of:

operating said printer under PostScript mode.

13. The method of claim 1, said step of performing the halftone process being processed in a main central processing unit of the printer.

14. The method of claim 13, further comprising the step of:

transmitting the processed print data from the main central processing unit to a printer engine controller.

15. The method of claim 1, said step of receiving environmental state data being performed after said step of receiving and storing the print data.

16. An electrophotographic printer, comprising:

a printer engine, comprising:

a printer engine central processing unit; and an environmental sensor connected to said printer engine central processing unit, for detecting the environmental state of the printer engine and transmitting environmental state data to the printer engine central processing unit;

an engine controller connected to said printer engine central processing unit, for sending print data to the printer engine central processing unit and for receiving the environmental state data from the printer engine central processing unit and controlling a power supplying state of said printer engine;

a memory storing a plurality of halftone threshold tables corresponding to different environmental states of the printer engine; and a printer central processing unit connected to said engine controller and said memory, for controlling the printer, receiving environmental state data from the engine controller, for selecting a halftone threshold table from the memory based on the received environmental state data, and for performing a halftone process using the print data and the selected threshold data.

17. The electrophotographic printer of claim 16, said environmental sensor comprising a temperature sensor.

18. The electrophotographic printer of claim 17, said environmental sensor further comprising a humidity sensor.

19. The electrophotographic printer of claim 16, said environmental sensor comprising a humidity sensor.

20. The electrophotographic printer of claim 16, further comprising:

an operational panel for selecting functions and displaying the operational status of the printer.

21. The electrophotographic printer of claim 16, further comprising:

said memory having a capacity for holding three threshold tables corresponding to three environmental states of the printer engine.

* * * * *